United States Patent
His et al.

(10) Patent No.: US 8,129,300 B2
(45) Date of Patent: Mar. 6, 2012

(54) POROUS, FIRED CERAMIC FOAM

(75) Inventors: Christian His, Courbevoie (FR); Samuel Prigent, Cavaillon (FR); Matteo Scalabrino, Avignon (FR); Franceline Villermaux, Avignon (FR)

(73) Assignee: Saint Gobain Centre de Recherches et d'Etudes Europeen, Cavaillon (FR)

( * ) Notice: Subject to any disclaimer, the term of this patent is extended or adjusted under 35 U.S.C. 154(b) by 590 days.

(21) Appl. No.: 11/658,695

(22) PCT Filed: Jul. 26, 2005

(86) PCT No.: PCT/FR2005/001940
§ 371 (c)(1),
(2), (4) Date: Jun. 25, 2007

(87) PCT Pub. No.: WO2006/018536
PCT Pub. Date: Feb. 23, 2006

(65) Prior Publication Data
US 2008/0312064 A1 Dec. 18, 2008

(51) Int. Cl.
*C04B 38/02* (2006.01)
(52) U.S. Cl. .......................................... 501/84; 423/345
(58) Field of Classification Search .................... 501/84; 23/295 R; 502/439; 423/345
See application file for complete search history.

(56) References Cited

U.S. PATENT DOCUMENTS 6,808,663 B2 * 10/2004 Noguchi et al. ............. 264/44
2009/0069167 A1 3/2009 Tardivat et al.

FOREIGN PATENT DOCUMENTS

EP 1 329 439 7/2003
EP 1329439 7/2003

OTHER PUBLICATIONS

Balkevich et al. "Rheological Properties of a Molding Mass for the Production of Mullite—Cordierite Ceramics". D. I. Mendeleev Moscow Chemical Engineering Institute. All-Union Institute of the Construction Industry. Translated from Steklo i Keramika, No. 11, pp. 27-29, Nov. 1978.*
S. Rul, Ch. Laurent, A. Peigney, A. Rousset, Carbon nanotubes prepared in situ in a cellular ceramic by the gelcasting-foam method, Journal of the European Ceramic Society, vol. 23, Issue 8, Jul. 2003, pp. 1233-1241, ISSN 0955-2219, DOI: 10.1016/S0955-2219(02)00286-8. (http://www.sciencedirect.com/science/article/B6TX0-479TGT9-V/2/a2bae83755f4f.*
Chinese Office Action in corresponding 2005800255673, and English translation thereof.
Jia Cheng, "Foamceramic—based heat insulating light weight products", Hebei ceramics, No. 106, 2000, pp. 30-31.

* cited by examiner

*Primary Examiner* — Stuart Hendrickson
*Assistant Examiner* — Richard M Rump
(74) *Attorney, Agent, or Firm* — Young & Thompson (57) ABSTRACT

The invention relates to a porous, fired ceramic foam having a total porosity of between 50 and 92% and an intergranular porosity of at least 5%. In particular, the invention relates to a recrystallised silicon carbide foam.

10 Claims, 3 Drawing Sheets

POROUS, FIRED CERAMIC FOAM

The invention relates to a fired ceramic foam having intergranular porosity, in particular a foam based on recrystallized silicon carbide, to a method of producing said foam, and to the uses of said foam.

Porous ceramic foams are known porous products characterized by a low density (5% to 50% of theoretical density). They may be constituted from the vast majority of ceramic powders, in particular alumina, silicon carbide etc.

A number of manufacturing methods exist for producing porous ceramic foams.

The simplest of those methods comprises adding a pore-forming agent to a ceramic slip or a mixture for pressing. It is formed, and then undergoes a firing cycle to burn off the pore-forming agent. On burning off, the pore-forming agent leaves pores. That method is described in European patent EP-B1-0 1 140 731, for example. It has the disadvantage of resulting in the release of gas (which may be toxic) due to pyrolysis of the pore-forming agent. Further, it is difficult to manufacture thick pieces since it is then difficult to release the gas (the gas has to be evacuated homogeneously).

A further technique is to replicate a polymer foam, for example polyurethane. The foam is coated with a ceramic slip. It is then fired to burn off the polyurethane foam and sinter the ceramic foam of structure which is modeled on the starting polyurethane foam. By way of example, that method is described in U.S. Pat. No. 4,024,212. Difficulties arise linked to gas release (on burning off, the polyurethane releases dangerous gases containing C—N bonds). Further, it is difficult to produce parts with pores with dimensions of less than 200 μm [micrometers].

An alternative technique is to create pores by forming gases by a chemical reaction between various additives of a ceramic slip. By way of example, that method is described in U.S. Pat. No. 5,643,512 or U.S. Pat. No. 5,705,448. Here again, problems arise linked to gas release. Further, that technique must be combined with a foam consolidation technique.

One technique consists of mechanically introducing a gas into a slip by agitating. Here again, that method has to be combined with a foam consolidation technique.

Several other possibilities which exist for consolidating foam can be used to carry out the two techniques mentioned above.

A first solution consists of mixing polymerizable monomers with the ceramic slip. Under particular conditions, monomer polymerization causes the foam to consolidate. That method is described in EP-B1-0 759 020, for example. In contrast, the high cost of the monomers which can be used and problems with controlling the polymerization conditions have prevented that technique from being developed on an industrial scale.

A second solution consists in cross-linking the polymers in a ceramic slip. As with the above technique, said cross-linking causes the foam to consolidate. That method is described in EP-A-0 330 963, for example. In contrast, the high cost of the cross-linking agents which can be used, and problems with controlling the cross-linking conditions have prevented that technique from being developed on an industrial scale.

A more recent method of manufacturing porous ceramics is described in EP-A1-1 329 439. That method includes the following steps:

1) preparing a suspension of a ceramic powder in a dispersing agent;

2) preparing a solution containing a biogel, also termed a "hydrocolloid", and keeping the temperature above the gelling temperature of the solution;

3) mixing said suspension and said solution, adding a foaming agent to obtain a foam, the temperature being kept sufficiently high to prevent the biogel from gelling;

4) casting the foam into a mold;

5) cooling until the biogel gels;

6) drying then firing the foam obtained.

Using a biogel to consolidate the foam can avoid the toxicity problems mentioned above. However, it turns out that if the foam cast into the mold is more than 60 mm [millimeters] thick, the foam does not have a structure that is homogeneous. Further, in that method, the quantity of water in the final mixture is large (45% to 50% by weight), which causes difficulties with drying, in particular for parts with large dimensions. Thus, it is not possible to manufacture porous ceramic parts with a homogeneous structure with such dimensions.

The French patent application filed by Saint Gobain Centre de Recherches et d'Etudes Europeen with number FR-A-0408330 describes an improved method of manufacturing porous ceramic foam parts with a homogeneous density having dimensions of 60 mm or more.

To this end, FR-A-0408330 proposes a method of manufacturing a porous ceramic part comprising the following steps in succession:

a) preparing a mixture M containing a ceramic powder in suspension, at least one gelling agent and at least one foaming agent, at a temperature that is higher than the gelling temperature of said gelling agent;

b) shearing said mixture M at a foaming temperature that is higher than said gelling temperature to obtain a foam;

c) gelling said foam by cooling said mixture M to a temperature below the gelling temperature of said gelling agent;

d) drying said gelled foam to obtain a preform;

e) firing said preform by high temperature treatment to obtain a fired ceramic foam.

According to that method, a stabilizing agent is added to the mixture M, which agent has an instantaneous viscosity, in Pa·s [pascal·seconds], that increases by a factor of at least ten when the shear rate of said stabilizing agent is reduced from 100 per second ($s^{-1}$) to 0.

The inventors of the invention described in FR-A-0408330 have observed that subsidence of the foam when carrying out the method of EP-A1-1 329 439 occurs during a critical period between the end of the shear step and the onset of gelling. During that period, the gelling agent makes no substantial contribution to structural stabilization of the foam which, at thicknesses of more than 60 mm, collapses under its own weight. In attempting to identify the cause of the subsidence, they proposed adding a stabilizing agent to the mixture. The stabilizing agent is selected for its capacity to considerably increase the viscosity of the mixture as soon as shearing of the mixture ceases, to stiffen the foam sufficiently to prevent it from collapsing until the gelling agent gels and can exert its stabilization function. It thus becomes possible to manufacture parts from a porous ceramic foam, with density that is homogeneous, having dimensions of 60 mm or more, and/or with complex shapes (cones or hollow cylinders, a portion of a hollow sphere, etc).

The choice of ceramic powders used in the various methods described above is generally guided by the constraints under which the foams are placed in service, in particular as regards mechanical strength or thermal conductivity.

In certain applications, for example for use as a catalyst support, the available surface areas must also be as large as possible.

Thus, there exists a constant need for ceramic foams having greater and greater available surface areas or, for an equivalent available surface area, a lower density.

The invention aims to satisfy this need.

In accordance with the invention, this aim is achieved by a fired ceramic foam with porous walls with a total porosity in the range 50% to 92% (i.e. a density in the range 8% to 50% of the theoretical density of the material constituting said foam) and an intergranular porosity of at least 5%, preferably at least 8%, more preferably at least 10%.

The ceramic foam of the invention differs from prior art ceramic foams, which have dense cell walls, in that they have intergranular porosity. As can be seen in more detail in the remainder of the description, said intergranular porosity develops the available surface area at the walls of the foam cells. For identical cell densities, a foam of the present invention thus has a much greater surface area which is exposed to the environment. The foam of the invention thus represents a considerable technical advance in the search for porous ceramic foams having a high available surface area.

Preferably, the fired ceramic foam with porous walls of the invention, or with "intergranular porosity", has one or more of the following characteristics:
- the intergranular porosity is formed by pores less than 10 μm [micrometers] in size, preferably less than 8 μm, preferably with a mean of about 5 μm;
- the mean intergranular pore size is 10 to 100 times smaller than that of the cellular pores. Preferably, the mean cellular pore size is between 80 μm and 120 μm, preferably about 100 μm, and/or the mean intergranular pore size is between 1 μm and 10 μm, preferably about 5 μm;
- preferably, at least a part of the cells, preferably all of the cells, are defined by walls which are at least in part, preferably completely formed from recrystallized silicon carbide. More preferably, the porous ceramic foam having an intergranular porosity comprises at least 95% by weight of recrystallized silicon carbide. Preferably, the porous ceramic foam with an intergranular porosity comprises more than 98% by weight, more preferably substantially 100% recrystallized silicon carbide;
- more than 15% by number of the cellular pores are more than 300 μm in size;
- fewer than 10% by number of the cellular pores are less than 10 μm in size, and/or 20% to 85% of the cellular pores have a size of less than 300 μm and/or 4% to 40% of the cellular pores have a size of more than 450 μm, the percentages being percentages by number;
- the porous ceramic foam has fewer than 1500, preferably fewer than 1000, more preferably fewer than 700 cellular pores per dm² [square decimeter] at its surface;
- the porous ceramic foam has a thickness of more than 60 mm.

The invention also provides a method of producing a porous ceramic foam of the invention comprising the following steps in succession:
a) preparing a mixture M containing a ceramic powder in suspension, at least one gelling agent and at least one foaming agent, at a mixing temperature which is higher than the gelling temperature of said gelling agent;
b) shearing said mixture M at a foaming temperature which is higher than said gelling temperature, to obtain a foam;
c) gelling said foam by cooling said mixture M to a temperature below the gelling temperature of said gelling agent;
d) drying said gelled foam to obtain a preform; and
e) firing said preform to obtain a porous ceramic foam; remarkable in that the mixture M comprises silicon carbide and in that firing in step e) is carried out under conditions which allow said silicon carbide to consolidate by an evaporation-recrystallization mechanism.

In the remainder of the description, said firing is termed "high temperature firing". Said firing leads to the formation of recrystallized silicon carbide.

Preferably, the method of the invention also possesses one or more of the following characteristics:
- preferably, the ceramic powder used in step a) has more than 95% by weight of silicon carbide;
- the particle sizes of the ceramic powder employed in step a) are distributed in a bimodal distribution. As an example, it is possible to use a powder formed from two grades of silicon carbide having different median diameters;
- preferably, the high temperature firing treatment temperature and all of the organic components used are determined so that all of said organic components are burned off during firing;
- preferably, a stabilizing agent with an instantaneous viscosity, in Pa·s, that increases by at least a factor of ten when shearing of said stabilizing agent is reduced from $100\ s^{-1}$ to 0 is added to said mixture M;
- the instantaneous viscosity of said stabilizing agent, in Pa·s, increases by a factor of at least one hundred when the shear rate of said stabilizing agent is reduced from $100\ s^{-1}$ to 0. Advantageously, the effect on stabilization of the foam is enhanced, which allows porous parts with thicknesses of more than 90 mm to be manufactured;
- the change in viscosity of said stabilizing agent as a function of the shear rate of said stabilizing agent is substantially reversible. Hence, when the shear rate of mixture M increases, the influence of the stabilizing agent on the viscosity of the mixture reduces, and may even become negligible. Advantageously, the presence of stabilizing agent thus does not result in a major increase in energy requirement;
- in step a), said mixture M is prepared from a ceramic slip A, a pre-mixture B containing at least one gelling agent and a stabilizing agent and a pre-mixture C containing at least one foaming agent;
- said stabilizing agent is selected so that, at the end of step c), the viscosity of said foam is more than 1000 Pa·s at 20° C. Preferably, said stabilizing agent is a hydrocolloid, preferably of vegetable origin, more preferably selected from the group formed by xanthan and carrageenan or a mixture thereof. The preferred stabilizing agent is xanthan. Advantageously, the hydrocolloids of vegetable origin are eliminated during the step of high temperature firing treatment of the preform, which produces a high purity fired part;
- the amount of said stabilizing agent in said mixture M is in the range 0.05% to 5% by weight, preferably in the range 0.1% to 1% by weight;
- said mixture M has a water content of less than 40%, preferably less than 30%, as a percentage by weight;
- said gelling agent is a hydrocolloid of animal or vegetable origin which can gel said composition thermoreversibly following foaming. Preferably, said gelling agent is gelatin. Advantageously, the gelling agent is eliminated during the step of high temperature firing treatment of the preform, which produces a high purity fired foam. More preferably, the amount of gelling agent in the mixture M is in the range 1% to 10%, preferably in the range 1% to 6% by weight;
- in step a), a plasticizing agent is preferably added to said mixture M in a quantity by weight in the range multiplying that of said gelling agent by 0.25 to 1. More preferably, the plasticizing agent is selected so that it burns of at a temperature which is higher than the evaporation temperature of the liquid serving in step a) to take the ceramic powder into suspension, generally water.

Finally, the invention provides the use of a porous ceramic of the invention or of a porous ceramic manufactured by means of a method of the invention, for catalysis supports, for the filtration of hot gases or liquids, as a diffuser (heated part allowing the air/gas mixture required for combustion to pass through) in a gas burner, in a solar volumetric receiver or in furnace furniture (saggers).

Further characteristics and advantages of the present invention will become apparent from the following description and accompanying drawings in which.

In the various figures, identical reference numerals are used to designate identical or analogous features.

Recrystallization is a well known phenomenon corresponding to consolidation by evaporation of the smallest silicon carbide grains then condensation to form bonds between the largest grains.

The term "recrystallized silicon carbide" means silicon carbide recrystallized during the step of firing the ceramic foam by high temperature treatment.

The maximum dimension of a pore is termed the "pore size". In the products of the invention, the pores have a quasi-spherical shape, so the size is the diameter.

The pore size is measured by analyzing images of the surface of fired foams.

There follows a description of a method that can be used to manufacture the ceramic foams shown in FIGS. 1 to 4 and 7 to 9.

This method comprises the following steps in succession:

a) preparing a mixture M containing a ceramic powder in suspension, at least one gelling agent and at least one foaming agent, at a mixing temperature which is higher than the gelling temperature of said gelling agent;

b) shearing said mixture M at a foaming temperature which is higher than said gelling temperature, to obtain a foam;

c) gelling said foam by cooling said mixture M to a temperature below the gelling temperature of said gelling agent;

d) drying said gelled foam to obtain a preform;

e) firing said preform by high temperature treatment to obtain a porous ceramic foam.

In the first step a) of this manufacturing method, a mixture is prepared containing a ceramic powder in suspension, preferably in water, at least one gelling agent and at least one foaming agent. Further, a stabilizing agent is preferably added to said mixture M.

Preferably, the following procedure is followed.

Firstly, the following is prepared:
- a slip A, by dispersing ceramic powder and a dispersing agent in water using a conventional technique;
- a pre-mixture B, by dissolving gelling and stabilizing agents in water at a temperature which is higher than the gelling temperature of the gelling agent;
- a pre-mixture C, by dissolving a foaming agent in water.

The quantity of ceramic powder in the slip A is preferably in the range 50% to 90% by weight, more preferably in the range 70% to 85% by weight of the slip A. Preferably, the mixture M contains 50% to 80%, preferably 60% to 70% by weight of ceramic particles.

The nature of the ceramic powder is adapted as a function of the ceramic powder to be manufactured.

When manufacturing the recrystallized silicon carbide foam of the invention, the powder is a silicon carbide powder the granulometric distribution of which is preferably bimodal. The first mode is preferably less than 5 µm, more preferably less than 3 µm, still more preferably less than 1 µm, and the second mode is preferably more than 10 µm, more preferably more than 20 µm. Said granulometric distribution can advantageously produce a ceramic foam having a particularly developed intergranular porosity.

The dispersing agent, for example a polyacrylate type surfactant, is selected to be effective at the mixing temperature.

The gelling agent is preferably a hydrocolloid of animal or vegetable origin which can gel said composition thermoreversibly after foaming, for example gelatin, carrageenan or a mixture thereof.

Any stabilizing agent may be used. Preferably, it has the property of having viscosity that increases by a factor of at least ten when the shear rate gradient reduces from $100\ s^{-1}$ to 0. Preferably, the stabilizing agent is selected so that the viscosity of the mixture M during shear barely increases due to its incorporation into this mixture.

Advantageously, it is thus possible to use mixers employed in the prior art without having to resort to increasing the water content of the mixture. Increasing the amount of water would cause problems for subsequent drying.

Preferably, the stabilizing agent is selected so that it is reversible. More preferably, the stabilizing agent and gelling agent are selected so that:
- the viscosity of the gelled foam is greater than or equal to that of a gelled foam obtained from a mixture identical to mixture M but which does not contain a stabilizing agent; and
- the viscosity of the foam obtained between steps b) and c) (before gelling and after the foaming operation is complete) is greater than or equal to that of a gelled foam obtained from a mixture which is identical to mixture M but which does not contain a gelling agent.

Preferably, the stabilizing agent and gelling agent are selected so that they substantially do not interact with each other. Associations of gelatin and xanthan and/or carrageenan, preferably xanthan alone, are especially preferred.

Xanthan and carrageenan are physical gels, i.e. have a reversible network structure in which bonds are formed by physical interaction (crystallization, helix formation, vitrification, etc). As an example, the xanthan molecule forms into a single, double, or triple helix which interacts with other molecules to form a complex network. In solution in water, aggregates are formed with weak bonds. Said aggregates may be dissociated by shearing.

Preferably, at least one plasticizing agent, preferably in the liquid form at the temperature at which the mixture M is prepared, preferably a polyol, more preferably glycerol, is added to the pre-mixture B. The plasticizing agent is selected to have good compatibility with the gelling agent, i.e. a capacity to remain in the mixture M and thus to resist migration and solvents, without causing phase separation. Preferably, the amount of plasticizing agent is in the range multiplying that of the gelling agent by 0.25 to 1.

The foaming agent, preferably a soap, is preferably added to the pre-mixture C in a proportion in the range 55% to 75% by weight of said pre-mixture. More preferably, the quantity of foaming agent is determined so that its quantity in the mixture M is in the range 1% to 3% by weight.

The mixture M may also contain one or more thermoplastic binders which are normally used in ceramics.

The slip A and the pre-mixture C are then added to the pre-mixture B with mechanical stirring, the temperature, termed the "mixing temperature", being kept above the gelling temperature of the gelling agent. Preferably, pre-mixtures A, B and C are mixed immediately after preparing them to form the mixture M. The stabilizing agent produces aqueous solutions with a viscosity which is stable in the temperature range used.

The pH of the pre-mixture B may be acidic, basic, or neutral and is preferably selected to allow good dispersion with the pre-mixture A.

In step b), the mixture M is sheared to foam it. The shear may result from mechanical agitation, blowing gas, or by any combination of those two techniques. When blowing gas, it is preferable to use a membrane provided with calibrated holes.

During said step b), if the viscosity of the stabilizing agent is reversible under the effect of shear, shear reduces the viscosity of the mixture.

Step b) is carried out at a temperature which is higher than the gelling temperature of the gelling agent, for example at the mixing temperature.

After producing the ceramic foam, the shearing is stopped then, optionally, the foam is cast into a mold.

The presence of stabilizing agent immediately increases the viscosity of the mixture because shearing has ceased. The stabilizing agent thus stiffens the foam structure even though the temperature remains higher than the gelling temperature. Any subsidence in the foam onto itself before the gelling step is thus avoided and it becomes possible to manufacture stable foams with a thickness of more than 60 nm, or even more than 80 mm.

In step c), the foam is cooled or allowed to cool to a temperature below the gelling temperature of the gelling agent, preferably to ambient temperature (10° C.-25° C.). Gelling advantageously produces a gelled foam which is sufficiently rigid to be manipulated without degrading. The method is thus well suited to industrial application.

The gelled foam is then dried at ambient temperature and preferably placed in a furnace at a temperature of 100° C. to 120° C. to obtain a preform which may be fired. The preform or biscuit may advantageously be up to 80 mm thick, or even 150 mm thick.

To manufacture ceramic foams of the type shown in FIGS. 1 to 4, the preform is calcined in air at its sintering temperature, namely 1200° C.-1500° C. for cordierite and 1400° C.-2300° C. for alumina, mullite or zirconia or for silicon carbide. Possible conditions for high temperature sintering of silicon carbide are described in French patent FR-A-2 313 331.

Figure 7:
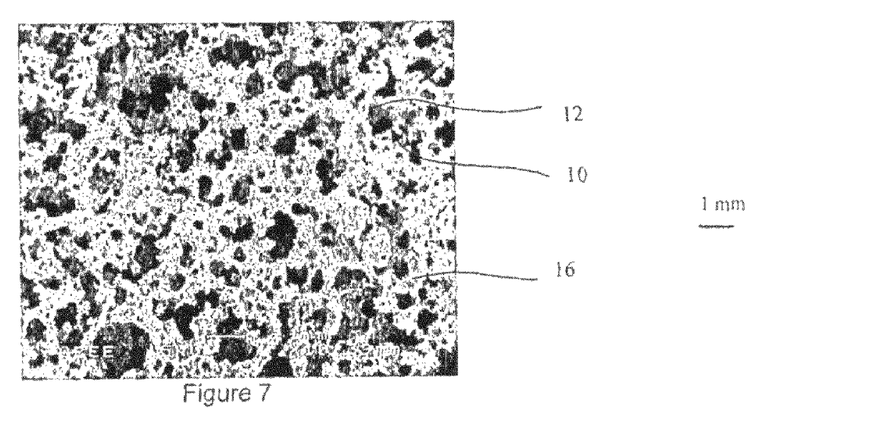
FIGS. 7 to 9 show, at different magnifications, scanning electron microscope images of samples taken 10 mm to 20 mm from the surface of sintered foams manufactured using a method in accordance with the invention.
Figure 8:
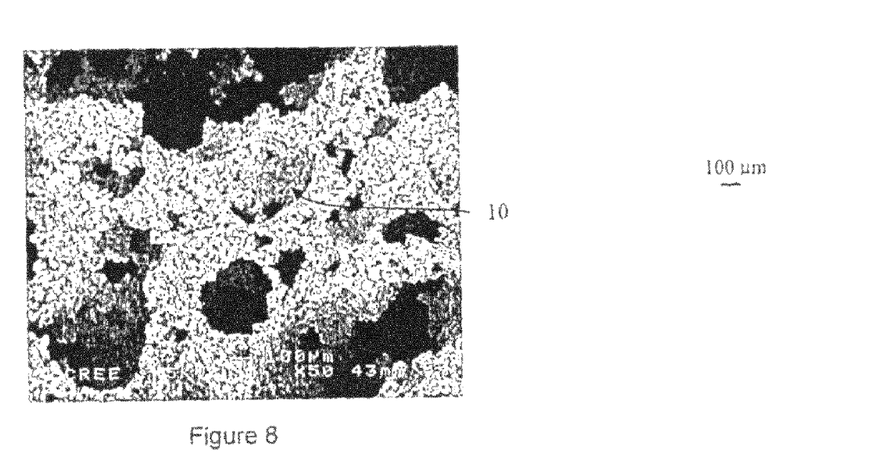
Figure 9:
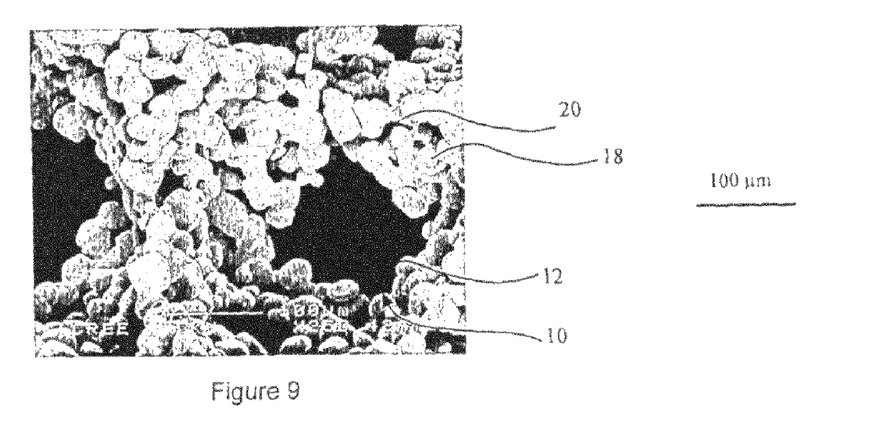

The conditions of firing step e) can produce ceramic foams of the invention of the type shown in FIGS. 7 to 9, and are well known, since recrystallization of silicon carbide is an old technique. Reference may, for example, be made to U.S. Pat. No. 2,964,823, granted on Dec. 20, 1960, or to the article "Finely Layered Recrystallized Silicon Carbide for Diesel Particulate Filters", Method Engineering, cfi/Ber. DKG 81 (2004), no 10.

Preferably, the preform is calcined in a non oxidizing atmosphere, preferably in a neutral atmosphere, More preferably in argon, at a temperature which can produce recrystallized silicon carbide, preferably in the range 1800° C. to 2500° C., more preferably in the range 2050° C. to 2350° C.

Other conditions for the high temperature firing treatment may be envisaged, provided that they result in recrystallization of silicon carbide.

After placing in the furnace and before or after firing by high temperature treatment, the foam may be machined to obtain a part with the desired dimensions.

The porous ceramic obtained by firing the preform by high temperature treatment, of the type shown in FIGS. 7 to 9 or FIGS. 1 to 4, is a foam with an open, interconnected structure. It advantageously has a density after firing in the range 8% to 50% of the theoretical density of the material (equal to 4 grams per cubic centimeter for alumina and 3.2 grams per centimeter cubic for recrystallized silicon carbide), i.e. 50% to 92% porosity.

The cellular pore size is generally between 10 μm and 2000 μm.

The foam has a plurality of cells 10 connected to other adjacent cells via windows 12. A cell at the surface of the porous ceramic foam also has one or more openings 16 which open to the outside. The term "interconnecting porosity" is used to define the porosity created by the interconnecting windows 12 between the cells and by the openings 16 of the superficial cells.

Figure 1:
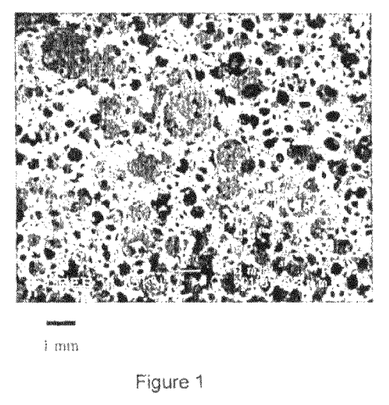
FIGS. 1 to 4 show, at different magnifications, scanning electron microscope images of samples taken 10 mm to 20 mm from the surface of sintered foams manufactured using a method as described in FR-A-0408330 using an alumina powder.
Figure 2:
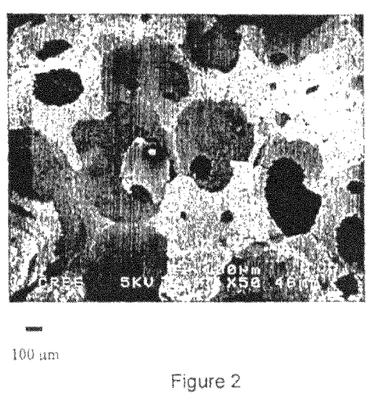
Figure 3:
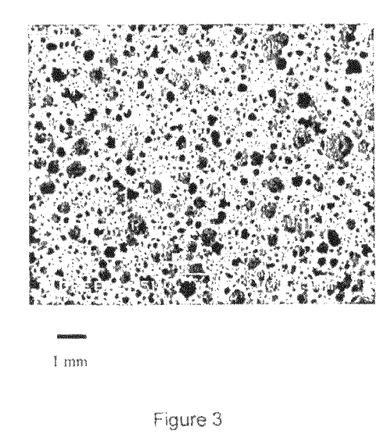
Figure 4:
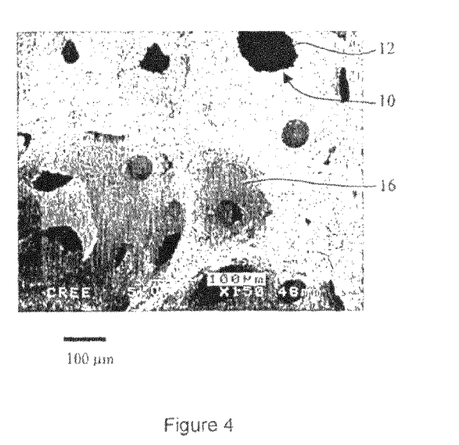
Figure 5:
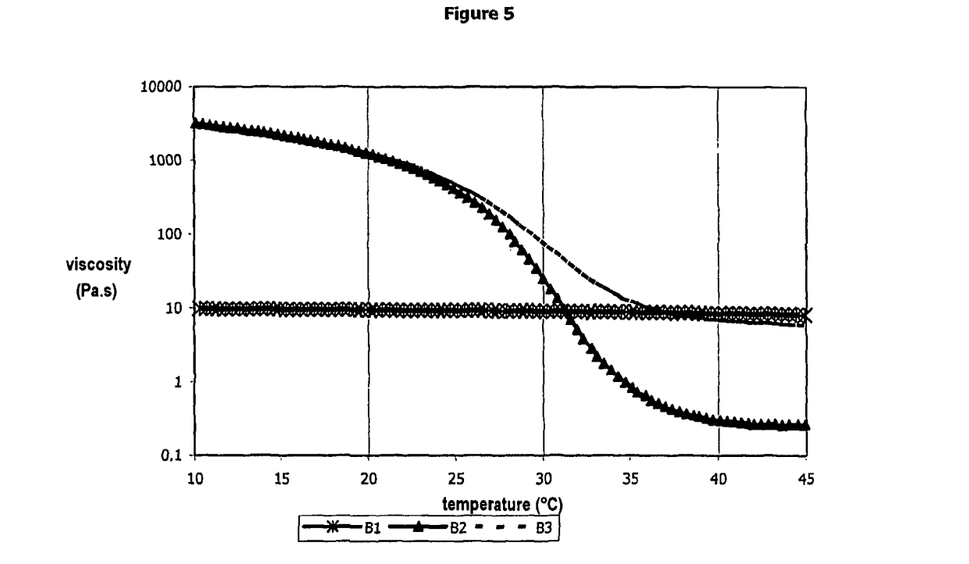
FIGS. 5 and 6 are graphs showing the rheological behavior of various pre-mixtures B.
Figure 6:
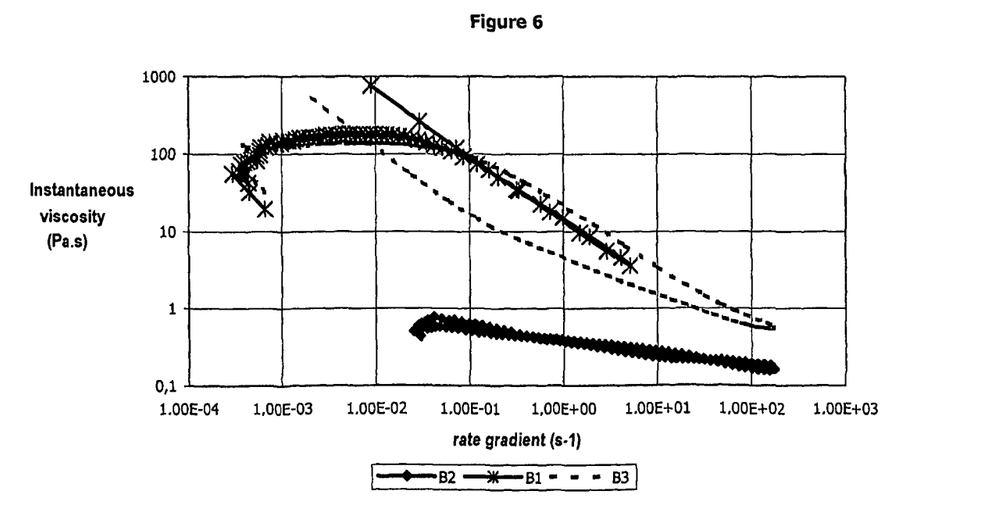

We shall refer now to FIGS. 5 and 6.

FIG. 5 shows the change in viscosity of three pre-mixtures B1, B2 and B3, provided by way of example:
  B1 contains 87% water, 7.4% glycerin, 4.8% polyvinyl alcohol and 0.8% xanthan;
  B2 contains 77.3% water, 6.5% glycerin, 4.2% polyvinyl alcohol and 12% gelatin;
  B3 contains 76.7% water, 6.5% glycerin, 4.2% polyvinyl alcohol, 11.9% gelatin and 0.7% xanthan.

Said pre-mixtures were prepared at 80° C. then kept at 40° C. for 3 hours. The viscosity of these mixtures, which were allowed to stand, was then measured as a function of their temperature, reducing the temperature by 1° C. per minute from 45° C. (close to the temperature at which the mixture M has produced) to 10° C. The measurement was made using a Bohlin® CVO 120 viscometer with cone/plate geometry (diameter 40 mm, angle 4°) oscillating at 1 hertz with a deformation of 0.01. The results of test A are shown in FIG. 5.

FIG. 5 shows that xanthan alone (curve B1) could not vary the viscosity of the mixture as a function of temperature. Thus, xanthan is not a thermoreversible gel, unlike gelatin (curve B2). Thus, xanthan does not appear to be suitable for varying the viscosity of a ceramic mixture as a function of temperature. Thus, in particular, it appears to be unsuitable for gelling a ceramic foam during cooling thereof.

FIG. 5 also shows that xanthan cannot by itself produce a high viscosity which is capable of coagulating a ceramic foam. In contrast, gelatin can produce satisfactory viscosities at ambient temperature (10° C.-25° C.) which are between 200 and 500 times higher than those obtained with xanthan alone.

Finally, FIG. 5 shows that the presence of xanthan does not retard the gelling action of the gelatin, the effect of the xanthan being negligible at temperatures below 25° C. The association of xanthan and gelatin appears to have substantially no technical effect at temperatures below 25° C. and thus would only appear to increase the manufacturing costs.

In FIG. 6, the instantaneous viscosities of B1, B2 and B3 at 45° C. are shown as a function of this rate gradient (or "shear rate"). To obtain the results shown in FIG. 6, the shear rate was increased, then kept steady for 1 minute, then the shear rate was decreased. During the entire test period, carried out at a temperature of 45° C. (close to the temperature at which mixture M was produced), the change in viscosity was measured. The measurements were carried out with a Bohlin® CVO 120 viscometer with cone/plate geometry (diameter 40 mm, angle 4°) in rotation mode.

It was observed that in the absence of xanthan, the viscosity of the gelatin did not change or hardly changed as a function of the shear rate. In contrast, the instantaneous viscosity of the mixture of gelatin and xanthan, like that of xanthan alone, reduced very substantially when the shear rate increased and reached very high values when the shear reduced, even for low amounts of xanthan.

The inventors have also shown that an increase or reduction in the viscosity of the product (gelatin, xanthan or a mixture of xanthan and gelatin), following a change in temperature or shear rate, under the same temperature and shear conditions, results in an improvement or deterioration respectively in the structural behavior of the foam obtained by shear of a refractory composition incorporating said product.

At the end of the shear step b), the mixture of gelatin and xanthan incorporated into the mixture M then results, according to FIG. 6, in an immediate improvement in the structural behavior of the foam in proportions which are vastly superior to that which gelatin alone could produce. The foam is thus sufficiently rigid not to collapse upon itself. It is easy to handle. Finally, the action of a mixture of xanthan and gelatin avoids modifying the structure (coalescence of air bubbles, segregation of ceramic powder, etc) which could result in heterogeneity of the product and fragilization.

The temperature of the foam then drops progressively which, as can be seen in FIG. 5, further increases the structural behavior of the foam in proportions which are vastly superior to that which xanthan alone could produce. The foam is then sufficiently rigid to be able to be manipulated under industrial conditions without deteriorating.

The actions of gelatin and xanthan are thus wholly complementary as regards carrying out the method of the invention, in particular for the manufacture of parts with large dimensions.

FIGS. 7 to 9 show scanning electron microscope images of a recrystallized ceramic silicon carbide foam with an intergranular porosity, corresponding to Example 21 of the invention, described below.

This foam was produced in the particular conditions in which the ceramic powder used in step a) of the method described above was a powder comprising at least 95% by weight of silicon carbide, and in which the high temperature firing treatment was carried out under conditions allowing the silicon carbide to recrystallize.

Said conditions are well known to the skilled person.

It should be noted that the ceramic walls defining the cells are not of the same nature in FIGS. 1-4 and 7-8. The alumina walls (FIGS. 1 to 4) are dense, while the walls of recrystallized silicon carbide (FIGS. 7 to 9) are porous.

The recrystallized silicon carbide walls 17 defining the cells 10 are formed by agglomeration of grains 18, this agglomeration leaving interstices 20 or "intergranular pores" between the grains 18.

The grains 18 are formed by the largest particles of the silicon carbide powder used in step a). The granulometric distribution of grains 18 is thus substantially the same as that of these largest particles.

The walls 17 thus have a porosity which is termed "intergranular". The intergranular porosity is thus constituted by the interstitial spaces which are necessarily created between the agglomeration grains of these grains.

In the particular circumstance of the recrystallized silicon carbide foams of the invention, the intergranular porosity coexists with the "interconnecting porosity" between the cells of the foam.

As described above, the interconnecting porosity is created by "cellular pores", namely the interconnection windows 12 between the cells 10 and the openings 16 opening to the outside of the superficial cells. The interconnecting porosity is thus formed by openings the contours of which are not the necessary consequence of grain agglomeration, but result from a particular arrangement of these grains. Unlike the intergranular porosity, it allows a direct connection (straight through) between the adjacent cells.

The total porosity is the sum of the interconnecting porosity and the intergranular porosity.

In the example shown in FIGS. 7 to 9, the mean cellular pore size is about 100 µm, while the mean intergranular pore size is about 5 µm. The total porosity of Example 21 is 86% (density 0.43 g/cm$^3$ [gram/cubic centimeter] and the intergranular porosity is about 10%.

The intergranular porosity may be modified as a function of the size of the grains of ceramic powder used, in particular silicon carbide.

The interconnecting porosity may be modified as a function of the foaming agent employed, in particular as a function of its quantity in the initial mixture.

The presence of an adjustable double porosity, in particular for the recrystallized silicon carbide-based ceramic foams of the invention, is particularly advantageous.

The presence of an intergranular porosity produces both a very large available surface area and low density.

The intergranular porosity foams of the invention are thus effective for filtration and/or as a catalyst support, while also being light.

Their low density also means low thermal inertia. Thus, said foams are highly resistant to high temperatures and are thus well suited for use as saggers. The recrystallized silicon carbide foams are particular useful in this application as they can resist very high temperatures. Because they are efficient conductors of heat, are resistant to high temperatures and allow air to pass, recrystallized silicon carbide foams are also entirely suitable for forming flame diffusers in infrared burners.

Preferably, the mean intergranular pore size is 10 to 100 times lower than that of the cellular pores. It is also preferable for the mean cellular pore size to be between 80 µm and 120 µm, preferably about 100 µm, and/or for the mean intergranular pore size to be between 1 µm and 20 µm, preferably about 5 µm.

The following non-limiting examples are provided in order to illustrate the invention.

In the examples, the starting materials employed were selected from:
  reactive $Al_2O_3$ or a mixture of reactive aluminas containing more than 99% of $Al_2O_3$, the median diameter being from 0.1 µm to 200 µm;
  zirconia containing more than 99% of $ZrO_2$, with a median diameter of 0.1 µm to 200 µm;
  Prox® $BO_3$ dispersing agent based on ammonium polyacrylate, sold by Synthron;
  GPA A0 gelatin, sold by Wesardt international;
  Satiaxane™ CX90T, xanthan gum produced and sold by SKW Biosystems;
  RHODOVIOL® 4/125, a polyvinyl alcohol with a low degree of hydrolysis (88 mol %) sold by Rhodia PPMC;
  glycerin sold by Moulet Peinture (Avignon, France);

Schäumungsmittel W53FL, an ammonium polyacrylate-based dispersing agent sold by Zschimmer and Schwarz GmbH;

cordierite with a median diameter of about 4 μm and containing 54% of $SiO_2$, 29% of $Al_2O_3$, 13% of MgO and less than 2.5% of $Fe_2O_3+TiO_2$;

mullite with a median diameter of about 9 μm and containing 26% of $SiO_2$, 73% of $Al_2O_3$, 13% of MgO and less than 2.5% of $Fe_2O_3+TiO_2$;

silicon carbide SiC-1 with a median diameter of about 0.6 μm, containing more than 99.5% SiC;

silicon carbide SiC-2 with a median diameter of about 2.5 μm, containing more than 99.5% SiC;

silicon carbide SiC-3 with a median diameter of about 23 μm, containing more than 99.5% SiC.

In all of the examples below, the dispersing agent was Prox® BO3, the foaming agent was always W53FL, the plasticizer was glycerin and the hardener was RHODOVIOL® 4/125.

The slip A was produced by dispersing ceramic powder and dispersing agent in water. The ceramic powder was alumina ($Al_2O_3$) for examples 1 to 16 and 19, mullite ($Al_2O_3$—$SiO_2$) for example 17, a mixture of 80% cordierite and 20% mullite for example 18, a mixture of 80% alumina and 20% zirconia for example 20 and at least two silicon carbide powders for examples 21 to 23 in the following proportions by weight:

|  | Example | | |
| --- | --- | --- | --- |
|  | 21 | 22 | 23 |
| SiC-1 (%) | 33 | | |
| SiC-2 (%) | | 66 | 67 |
| SiC-3 (%) | 67 | 34 | 33 |

For examples 21 to 23, 0.45% of 1N sodium hydroxide acted as the dispersing agent; the pH of the slip was thus about 9.

The pre-mixture B was produced in a water bath at 55° C. by dissolving gelatin GPA A0 and possibly xanthan, glycerin and hardening agent it in water.

The pre-mixture C was produced by dissolving two thirds (by weight) of foaming agent dissolved in a third of the water.

A and C were added to B in a water bath at 55° C. with constant mechanical agitation for 20 minutes. The proportions of constituents A, B and C in the final mixture M, without ceramic powder, are given in Table 1. The foam obtained was cast into a mold at ambient temperature, at less than 25° C. The dimensions of the mold were 300 mm×300 mm×45 mm except for example 19, where the mold was 80 mm deep (identical section: 300 mm×300 mm). It was dried for 24 hours at ambient temperature then for 24 hours at 35° C. with forced ventilation to obtain a preform.

This preform was then sintered in air for 4 hours at 1600° C. except for examples 1 and 2 for which the preform obtained was too friable to undergo a sintering cycle, and for examples 21 to 23 where the preform was fired in argon for 3 hours at 2270° C. to obtain a recrystallized silicon carbide.

It should be noted that during the high temperature firing treatment the dimensional shrinkage, of the order of 15% to 20%, was substantially the same in all directions.

Some characteristics of the ceramic foams obtained are shown in Tables 1 and 2.

TABLE 1

|  | Dispersing agent | Gelatin | Xanthan | Foaming agent | Water | Glycerin | Hardener | Density g/cm³ | Coagulation after casting | Cracks after drying | Mechanical strength mPa |
| --- | --- | --- | --- | --- | --- | --- | --- | --- | --- | --- | --- |
|  | % by weight in mixture M (1) | | | | | | | | | | |
| 1 | 0.6 | 5.3 | / | 2.2 | 27.9 | / | / |  | N |  |  |
| 2 | 0.6 | 5.2 | / | 2.1 | 29.9 | / | / |  | N |  |  |
| 3 | 0.6 | 3.1 | 0.1 | 2.2 | 28.6 | / | / | 0.57 | Y | Y | 2.3 |
| 4 | 0.7 | 1.8 | 0.2 | 2.2 | 28.9 | / | / | 0.48 | Y | Y |  |
| 5 | 0.7 | 1.0 | 0.2 | 2.2 | 29.2 | / | / | 0.47 | Y | Y |  |
| 6 | 0.7 | 1.8 | 0.1 | 2.2 | 28.7 | 1.0 | / | 0.50 | Y | N |  |
| 7 | 0.6 | 3.1 | 0.1 | 2.2 | 28.3 | 1.0 | / | 0.50 | Y | N |  |
| 8 | 0.6 | 2.4 | 0.1 | 2.2 | 28.5 | 1.0 | / | 0.52 | Y | N |  |
| 9 | 0.7 | 1.8 | 0.1 | 2.2 | 28.7 | 1.0 | / | 0.50 | Y | N |  |
| 10 | 0.6 | 2.4 | 0.1 | 2.2 | 28.4 | 1.0 | 0.3 | 0.53 | Y | N |  |
| 11 | 0.6 | 2.4 | 0.1 | 2.2 | 28.4 | 1.0 | 0.1 | 0.54 | Y | N |  |
| 12 | 0.6 | 1.8 | 0.1 | 2.2 | 29.0 | 1.0 | 0.6 | 0.50 | Y | N |  |
| 13 | 0.6 | 1.8 | 0.1 | 2.2 | 28.5 | 1.0 | 0.6 | 0.47 | Y | N |  |
| 14 | 0.6 | 1.8 | 0.1 | 2.2 | 28.3 | 1.0 | 0.6 | 0.94 | Y | N |  |
| 15 | 0.6 | 1.8 | 0.1 | 2.2 | 28.5 | 1.0 | 0.6 | 0.69 | Y | N | 4.2 |
| 16 | 0.6 | 1.8 | 0.1 | 2.2 | 28.3 | 1.0 | 0.6 | 1.08 | Y | N | 9.3 |
| 17 | 0.6 | 1.8 | 0.1 | 1.6 | 28.5 | 1.0 | 0.6 | 0.50 | Y | N |  |
| 18 | 0.6 | 1.7 | 0.1 | 1.5 | 33.1 | 0.9 | 0.6 | 0.44 | Y | N | 2.2 |
| 19 | 0.6 | 1.8 | 0.1 | 1.6 | 28.3 | 1.0 | 0.6 | 1.00 | Y | N | 6.5 |
| 20 | 0.6 | 1.8 | 0.05 | 2.2 | 28.5 | 1.0 | 0.6 | 0.55 | Y | N |  |
| 21 | 0 | 1.7 | 0.1 | 2.1 | 27.2 | 1.0 | 0.6 | 0.43 | Y | N | 0.4 |
| 22 | 0 | 1.8 | 0.1 | 2.3 | 27.2 | 1.0 | 0.7 | 0.40 | Y | N | 0.5 |
| 23 | 0 | 1.9 | 0.1 | 2.2 | 27.3 | 1.0 | 0.7 | 0.81 | Y | N | 1.7 |

(1) The complement was constituted by ceramic powder.

After casting, occasional immediate coagulation could be observed as soon as agitation and/or manipulation (casting into a mold) ceased. The term "coagulation" means the height of the cast part does not reduce and/or vary along the zones of the cast part. In the Table, "Y" means that coagulation was observed and "N" means that the structure of the cast foam changes after molding (no coagulation).

Finally, for certain foams the presence of several cracks was observed in the dry parts. The presence of cracks is indicated by a "Y" in Table 1, while "N" indicates that no cracks were observed. These cracks were principally located on the edges of the parts and were from a few mm to several cm [centimeters] in length. These cracks were not critical and could be eliminated by machining. However, they are annoying.

The density was measured using a conventional geometrical method and expressed in grams per cubic centimeter.

The results shown in Table 1 demonstrate the advantage of adding a stabilizing agent which can coagulate the structure obtained by mechanical foaming. Homogeneous parts with the desired dimensions were thus obtained.

The plasticizing agent could produce more flexible parts where drying did not induce the formation of cracks. Further, and preferably, as applies here, the plasticizing agent burns off at a temperature which is much higher than the water evaporation temperature. Thus, this compound will fulfill its role even with the dried part and, during firing, will allow a certain degree of moisture to be retained in the part and thus avoid firing too fast and a "crust" effect on the final product. This favorable effect is particularly useful in the manufacture of parts with large dimensions.

As described above, ceramic foams manufactured using the method described above, in particular the foams of the invention, have a structure formed from interlaced cells defined by ceramic walls which are connected together via windows. The cellular pore size is distributed between 10 μm and 2000 μm in a relatively homogeneous manner; less than 10% of the cellular pores have a diameter of less than 10 μm; 20% to 85% of the cellular pores have a diameter of less than 300 μm and 4% to 40% of the cellular pores have a diameter of more than 450 μm.

These inventive foams are also distinguished from currently known foams by a very extensive range of cellular pore sizes, the absence of a dominant cellular pore size and a smaller number of cellular pores per unit surface area. In general, this is less than 1500 cellular pores per $dm^2$.

Further, it will be seen that, when the density reduces, the porosity increases by increasing the size of the cellular pores while their number reduces. More than 15% of cellular pores, and sometimes at least 30% of cellular pores, have a diameter of more than 300 μm.

In contrast, current ceramic foams have a pore size which varies little as a function of density and is generally less than 300 μm for 90% of pores; the reduction in density is thus accompanied by an increase in the number of pores.

The presence of large cellular pores in the foams of the invention of Table 1 can also produce products with a very low pressure drop which is of particular advantage in certain applications, for example for gas filtration.

Said foams are also remarkable in that they are extremely pure chemically. Said purity is linked to the purity of the ceramic starting materials used, since all of the organic components used are burned off during firing by the high temperature treatment.

As has been clearly shown here, the invention provides a porous, fired ceramic foam which, because of the specific structure of the walls which define the cells, has a considerable surface area exposed to the outside environment. This novel microstructure of the cell walls thus opens up very broad vistas for development.

Clearly, the present invention is not limited to the embodiments and implementations described and provided as illustrative non-limiting examples.

In particular, the ceramic foam with an intergranular porosity of the invention is characterized by a particular microstructure, in particular a total porosity in the range 50% to 92% and an intergranular porosity of at least 5%. To the knowledge of the inventors, a fired ceramic foam with this microstructure, in particular a fired recrystallized silicon carbide foam is not known in the art. The invention thus provides any fired ceramic foam independently of the method employed to manufacture it.

In the preferred implementation of the invention, said microstructure results from recrystallization of silicon carbide during the step of high temperature firing treatment. However, other ceramic materials may be envisaged.

The invention claimed is:

1. A porous ceramic foam, comprising:
    a plurality of cellular pores having cellular walls, more than 15% of the cellular pores having a diameter of more than 300 μm;
    an interconnecting porosity formed by the cellular pores;
    a plurality of intergranular pores formed in the cellular walls;
    an intergranular porosity formed by intergranular pores of less than 10 μm in size; and
    a total porosity equal to the sum of the interconnecting porosity and intergranular porosity, wherein,
    the total porosity is in the range of 50% to 92%, and the intergranular porosity is at least 5%,
    the porous ceramic foam comprising recrystallized silicon carbide.

2. The porous ceramic foam according to claim 1, comprising at least 95% by weight of recrystallized silicon carbide.

3. The porous ceramic foam according to claim 1, wherein the intergranular porosity is at least 8%.

4. The porous ceramic foam according to claim 1, wherein the intergranular porosity is at least 10%.

5. The porous ceramic foam according to claim 1, wherein the intergranular porosity is formed by pores that are less than 8 μm in size.

6. The porous ceramic foam according to claim 1, wherein the mean intergranular pore size is 10 to 100 times smaller than the pore size of the cellular pores.

7. The porous ceramic foam according to claim 1, wherein a mean cellular pore size is between 80 μm and 120 μm and/or the mean intergranular pore size is between 1 μm and 10 μm.

8. The porous ceramic foam according to claim 1, wherein more than 15% of the cellular pores are more than 300 μm in size,
    less than 10% of the cellular pores are less than 10 μm in size,
    20% to 85% of the cellular pores are less than 300 μm in size, and
    4% to 40% of the cellular pores are more than 450 μm in size, the percentages being percentages by number.

9. An apparatus comprising the porous ceramic foam according to claim 1, wherein the apparatus is selected from the group consisting of thermal insulator, a catalyst support, an apparatus for the filtration of hot gas or liquids, a diffuser in a gas burner, a solar volumetric receiver, and furnace furniture.

10. The apparatus according to claim 9, wherein the porous ceramic foam is a thermal insulator in a furnace.

* * * * *